US008823738B1

(12) United States Patent
Aberg et al.

(10) Patent No.: US 8,823,738 B1
(45) Date of Patent: *Sep. 2, 2014

(54) MERGING ELECTRONIC DIAGRAMS (75) Inventors: Robert O. Aberg, South Grafton, MA (US); Vaithilingham Senthil, Natick, MA (US)

(73) Assignee: The MathWorks, Inc., Natick, MA (US)

( * ) Notice: Subject to any disclaimer, the term of this patent is extended or adjusted under 35 U.S.C. 154(b) by 423 days.

This patent is subject to a terminal disclaimer.

(21) Appl. No.: 12/208,894

(22) Filed: Sep. 11, 2008

Related U.S. Application Data (63) Continuation of application No. 12/177,670, filed on Jul. 22, 2008, which is a continuation of application No. 10/008,553, filed on Nov. 9, 2001, now Pat. No. 7,420,573.

(51) Int. Cl.
*G06T 11/60* (2006.01)

(52) U.S. Cl.
USPC .......................................................... 345/630

(58) Field of Classification Search
CPC ........................... G06T 11/206; G06F 17/505
USPC .......... 345/630, 634, 440, 440.1, 629; 702/71
See application file for complete search history.

(56) References Cited

U.S. PATENT DOCUMENTS

| | | | | |
|---|---|---|---|---|
| 5,086,408 A | * | 2/1992 | Sakata | 707/200 |
| 5,469,539 A | * | 11/1995 | Usuda | 715/841 |
| 5,845,270 A | * | 12/1998 | Schatz et al. | 706/11 |
| 5,974,254 A | * | 10/1999 | Hsu | 717/109 |
| 6,138,270 A | * | 10/2000 | Hsu | 717/125 |
| 6,912,707 B1 | | 6/2005 | Fontes, Jr. | |
| 7,420,573 B1 | | 9/2008 | Aberg et al. | |

FOREIGN PATENT DOCUMENTS

| | | |
|---|---|---|
| JP | 9-101982 | 4/1997 |
| JP | 409097272 A * | 4/1997 |

OTHER PUBLICATIONS

Araxis, "Overview of Araxis Merge v6.0 for Windows," retrieved online at http://www.araxis.com/merge/ (2003).
Free Software Foundation, "GNU Emacs Manual," retrieved online at http://www.gnu.org/manual/emacs-20.3/html_mono/emacs.html (1998).
U.S. Appl. No. 12/177,670, by Robert O. Aberg et al., filed Jul. 22, 2008, entitled "Merging Electronic Diagrams", 33 pages.

* cited by examiner

*Primary Examiner* — Jeffery A Brier
(74) *Attorney, Agent, or Firm* — Harrity & Harrity, LLP (57) ABSTRACT

The illustrative embodiment of the present invention provides a method of reconciling and merging differences between displayed electronic diagrams. After differences between corresponding areas of the two electronic diagrams are detected, the software provides a mechanism for merging different attributes between the diagrams. Alternatively, the second diagram may receive all of the differences identified from the first diagram. Distinctions are made between graphical and functional attributes noted as differences between the two diagrams prior to the merge operation. The illustrative embodiment of the present invention enables the user to specify which type of attribute differences should be merged (i.e., graphical differences, functional differences, both graphical and functional, or only selected differences).

20 Claims, 6 Drawing Sheets

| Object Type | "one" | "two" |
|---|---|---|
| Connection 2 | From A : B | N / A |

MERGING ELECTRONIC DIAGRAMS

RELATED APPLICATION

This application is a continuation of co-pending U.S. patent application Ser. No. 12/177,670, filed Jul. 22, 2008, entitled "Merging Electronic Diagrams" which is a continuation of U.S. Pat. No. 7,420,573, issued Sep. 2, 2008, entitled "System and Method for Merging Electronic Diagrams," the contents of which are incorporated herein by reference in their entirety.

FIELD OF THE INVENTION

The illustrative embodiment of the present invention relates generally to electronic diagrams and more particularly to merging electronic diagrams and their underlying data.

BACKGROUND OF THE INVENTION

Electronic diagrams, such as flowcharts and logic state diagrams which are displayed electronically, provide an approach to explaining complex systems. Electronic diagrams are composed of labeled blocks which represent features such as system components or system logic states. Each block in the electronic diagrams has a set of properties or attributes related to the underlying represented component or logic state. The block properties may be graphical properties related to the depiction of blocks, or the properties may be functional properties related to operations of the system. The blocks may be joined by lines representing connections between the system features. The electronic diagrams may be stateless diagrams or state diagrams. A state diagram, such as a representation of a finite state machine, is an example of an event-driven system. In an event-driven system, the system transitions from one state to another provided a condition required for the change from one state to the other is satisfied (i.e.: an event of a specified kind takes place). A state represents the condition of the system at a particular point in time. A stateless diagram depicts the flow of data or operations in a system from one component to another without depicting the state of the system. The depicted system may also be a purely computational system.

Both stateless diagrams and logic state diagrams are often depicted in an electronic format through the use of a computer diagramming application, such as Simulink™ running on MATLAB™, from The MathWorks Inc. of Natick, Mass. The diagramming applications provide displays of electronic diagrams to users of an electronic device. Conventionally, the electronic version of a diagram is stored on an electronic device, such as a computer system, which is interfaced with a display device that presents the electronic diagram to a user. Techniques available in graphical diagramming applications enable multiple diagrams to be presented to a user in a side-by-side display. Unfortunately, there currently exists no easy method of merging differences between two electronic diagrams being displayed to a user.

BRIEF SUMMARY OF THE INVENTION

The illustrative embodiment of the present invention provides a method of reconciling and merging two displayed electronic diagrams into one electronic diagram. After differences between corresponding areas of the two electronic diagrams are detected, the method of the illustrative embodiment of the present invention provides a mechanism for merging different features of a first of the diagrams into a second of the diagrams. The second diagram may receive and merge all of the differences identified from the first diagram, or only selected differences. Distinctions are made between graphical and functional feature differences in the two diagrams. The illustrative embodiment of the present invention enables the user to specify which type of feature differences should be merged (i.e., graphical differences, functional differences, both graphical and functional differences, or individually selected differences regardless of the classification).

In one embodiment of the present invention, an electronic device that is interfaced with a display device displays two electronic diagrams. Corresponding sections of the two diagrams are identified and the differences, if any, between the two diagrams are recorded. Selected differences from the first diagram are merged into the second diagram at the corresponding section in the second diagram for each of the differences.

In another embodiment of the present invention, an electronic device that is interfaced with a display device displays two state diagrams. Corresponding sections of the two state diagrams are identified and the differences, if any, between the two state diagrams are recorded. Selected differences from the first state diagram are merged into the second state diagram at the corresponding section in the second diagram for each of the differences.

In an additional embodiment of the present invention, an electronic device is interfaced with a network and with a display surface. The display device is used to display two electronic diagrams which are retrieved from the network to the electronic device. Corresponding sections of the two electronic diagrams are identified and the differences, if any, between the two electronic diagrams are recorded. The user-selected differences from the first electronic diagram are merged into the second electronic diagram at the corresponding section in the second diagram for each of the differences.

DETAILED DESCRIPTION

The illustrative embodiment of the present invention provides a method for merging two electronically displayed diagrams, such as flowcharts or logic state diagrams. The diagrams are analyzed to determine points of correspondence (i.e.: the points where the two diagrams are alike). The system components of the two diagrams are examined for differences. Differences between corresponding sections of the two diagrams are recorded as difference items. The difference items are further divided into functional differences and cosmetic differences. After presentment of the differences to a user of an electronic device, the selected differences for some or all of one of the diagrams are merged into corresponding sections of the other diagram.

Figure 1:
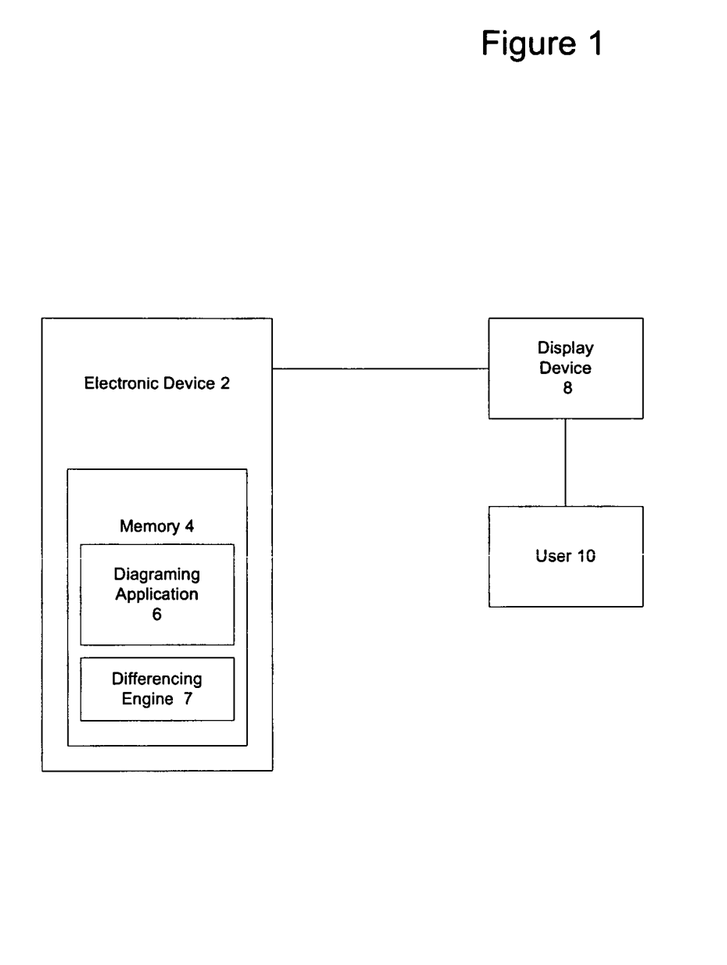
FIG. 1 depicts an environment suitable for practicing the illustrative embodiment of the present invention.

FIG. 1 depicts an environment suitable for practicing an illustrative embodiment of the present invention. An electronic device 2 includes memory 4. The memory 4 holds a diagramming application 6 capable of creating electronic versions of system diagrams such as block diagrams, state diagrams, signal diagrams, flow chart diagrams, sequence diagrams, UML diagrams, dataflow diagrams, circuit diagrams, ladder logic diagrams or kinematic element diagrams. A suitable diagramming application 6 is an application such as MATLAB, version 6.1 with Simulink, version 4.1. Also held in memory 4 is a differencing engine 7 which is used to detect differences between electronic diagrams. A display device 8 is interfaced with the electronic device 2 enabling the display of two diagrams from the diagramming application 6 to a user 10. In an alternate embodiment, the electronic device 2 is also interfaced with a network, such as the Internet. Those skilled in the art will recognize that the diagrams used by the diagramming application 6 may be stored either locally on the electronic device 2 or at a remote location interfaced with the electronic device over a network. Similarly, the diagramming application 6 may be stored on a networked server or a remote peer. The illustrative embodiment of the present invention analyzes the differences in system components in two diagrams, presents them to a user 10, and then merges the user-selected differences from one diagram into another. If the outcome of the merge operation is acceptable to the user 10, the user may save the outcome of the operation which merges the data in the underlying model or simulation that is being displayed as electronic diagrams. If the outcome of the merge operation is not acceptable to the user 10, the outcome is not saved and the underlying data is undisturbed by the merger operation.

The data represented by the electronic diagrams may be stored in any one of a number of different types of data structures. In one embodiment of the present invention, the diagrams use Simulink data objects to store the diagram's data. The simulink data objects may be used to define MATLAB data types that are specific to a user's application. Simulink includes built-in blocks which may be used to implement modeling functions desired by a user. The blocks in the electronic diagrams may model the behavior of specialized mechanical, circuit or software components, such as motors, servo-valves, power plants, filters, tires, modems, receivers and other dynamic components. The data objects hold both block attributes and functions. Those skilled in the art will recognize that the functions may include code written in C, Ada, Fortran, MATLAB or other programming languages. The electronic diagrams may encompass multiple domains within a single diagram.

The illustrative embodiment of the present invention includes a differencing engine 7 which walks down the hierarchy of the electronic diagram and finds blocks and connections that are present in both models or in only one model and compares them for differences. The differencing engine 7 first compares the two diagrams to determine points of correspondence between the two diagrams. This is accomplished using a matching algorithm. The matching algorithm applies rules to match components in the two diagrams. In one embodiment, the matching algorithm rules dictate that blocks or subsystems with different names are considered unique, even if everything inside of them is the same. In another embodiment, the matching algorithm rules dictate blocks or subsystems with the same positions or some pre-defined set of properties are considered to be a match, even if the names are different. Connections between blocks are considered unique if the source block or destination block or source port or destination port does not exist in both models. A port may be either a physical connection into which a device connects, or an endpoint to a logical connection (i.e.: port 80 is used for HTTP traffic in a TCP/IP network), depending upon the type of system being modeled by the electronic diagram. Ports of a block which are connected in one model and are not connected in the other model are also considered to be unique differences. In one embodiment, lines which are not connected to a source block and a destination block, are not compared at all for differences. In another embodiment, lines which are not connected to a source block and a destination block are compared for differences. The results of the matching algorithm are stored in a dataset containing a list of related pairs of corresponding electronic diagram elements, one from diagram A and one from diagram B in each entry in the list (where A and B are the two electronic diagrams being compared). Each item in the list that is unique or different is a difference item. The illustrative embodiment of the present invention is not dependent upon the use of any one particular method of detecting differences between electronic diagrams, as long as the detected differences are made available to the diagramming application 6 for merge operations.

In one embodiment of the present invention, the data structure used by the differencing engine 7 to record and track differences between two diagrams is a N×1 MATLAB cell array (where N is an integer value). A cell array is a MATLAB array for which the elements are cells. The cells are containers that can hold other MATLAB arrays, such as a real matrix, an image, a structure, an array of text strings, or a vector of complex values. Each cell in the cell array contains a cell array of 8 items. A unique handle, a floating point number, is assigned to each electronic diagram data element being stored in the cell array. Data items that are found to be different are marked as eligible for merge operations. Data items containing a child element are also marked for hierarchichal operations. Those skilled in the art will recognize that the type of data structure the differences are stored in may be altered without departing from the scope of the present invention.

Once matches have been established by the matching algorithm in the differencing engine 7, a compare algorithm compares each matched item for properties. The set of properties may be programmatically defined or chosen by a user. In one embodiment of the present invention, properties are broken down into two groups, graphical properties and functional properties. Graphical properties affect the appearance of the diagram, functional properties affect the performance of the depicted system. For example, a graphical difference occurs when two blocks, a block A and a block B, appear in both diagrams, but the first diagram locates the blocks in a different position in the diagram. A functional difference occurs when the two blocks produce different results in each diagram. Blocks may be considered to be different by the differencing engine 7 if any property is different. Connections may be semantic connections or direct connections. Semantic connections include GOTO and From blocks. Connections may be considered to be different when both the blocks and ports, source and destination, exist in both models but they are connected to a different block or port than that in the other model. Once the differences have been determined, the diagrams may be displayed to the user 10. In one embodiment of the present invention, diagram elements are listed side by side in a tree format, with the differences highlighted on the display device 8.

Figure 2:
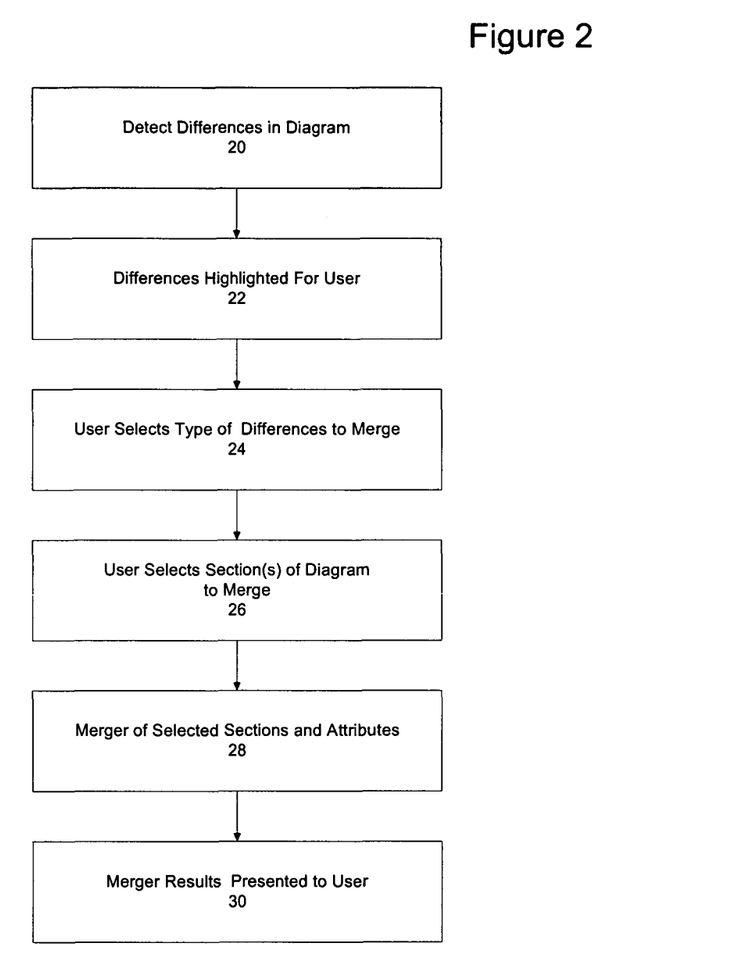
FIG. 2 depicts a top level view of the sequence of steps followed by the illustrative embodiment of the present invention to merge differences from one diagram to another.

FIG. 2 is a flow chart of the sequence of steps utilized by the illustrative embodiment of the present invention to merge differences between two electronic diagrams. The sequence begins when the differencing engine 7 detects differences in corresponding sections of two diagrams, such as flowcharts or state diagrams (step 20). The differences are highlighted and presented to the user 10 on the display device 8 (step 22). The user 10 selects the type of differences subject to the merge process and the direction in which the merging process should take place (i.e.: from the first diagram to the second diagram, or from the second diagram to the first diagram) (step 24). In an alternate embodiment, the type of difference being merged is pre-programmed in the differencing engine 7. The user 10 may also select specific corresponding sections of the two diagrams subject to the merge process (step 26). The diagramming application 6 performs the merging process selected by the user (step 28). Once complete, the two diagrams are presented to the user with the selected diagram having undergone the merge process (step 30). The user has the ability to activate an Undo feature to restore the electronic diagrams to their pre-merge status if dissatisfied with the result of the merge operation. Those skilled in the art will recognize that the merge process may have involved the entire diagram or only selected sections or attributes of the electronic diagram.

Merging commands in the illustrative embodiment of the present invention are processed by taking the output of the differencing engine 7 as input to the merge software which edits the electronic diagram per the user command. In the illustrative embodiment, the merging software emits diagram editing instructions to the diagramming software 6 via the diagramming software's editing API as a means of manipulating the destination diagram using the selected difference region data element(s) from the differencing engine 7 output. For example, if the current difference region is a block that exists in both diagrams A and B and the block property "SampleTime" differs between diagrams A and B and the user commands that the "SampleTime" property of the block in diagram A is to be merged to the matching block in diagram B, the merging software will match the current region's block handle with a unique handle entry in the current difference region in the differencing engine 7 output and retrieve the corresponding index of the cell element containing the difference region. The different property of the current difference region, "SampleTime" is changed using the diagramming software's parameter value editing function, set_param (h, 'SampleTime', x), where x is the value of the "SampleTime" property in diagram A and h is the handle of the block in diagram B.

In the illustrative embodiment, Simulink block diagrams are edited using APIs such as add_block, add_line, delete_block, delete_line, get_param and set_param. Stateflow diagrams are edited with APIs such as sf('get', . . . ) and sf('set', . . . ). For example, to change the property SampleTime of a Stateflow object h to value x, the merge software will use sf('set', h, 'SampleTime', x). To retrieve the value of "SampleTime" from Stateflow object h, the merge software will use sf('get', h, 'SampleTime'). The particular means or API used to edit the electronic diagram is not critical to the merge operation as long as the merge software can manipulate the electronic diagram sufficiently to complete the merge operation. The merge software may be part of the diagramming application 6 or may be a separate application.

Figure 3A:
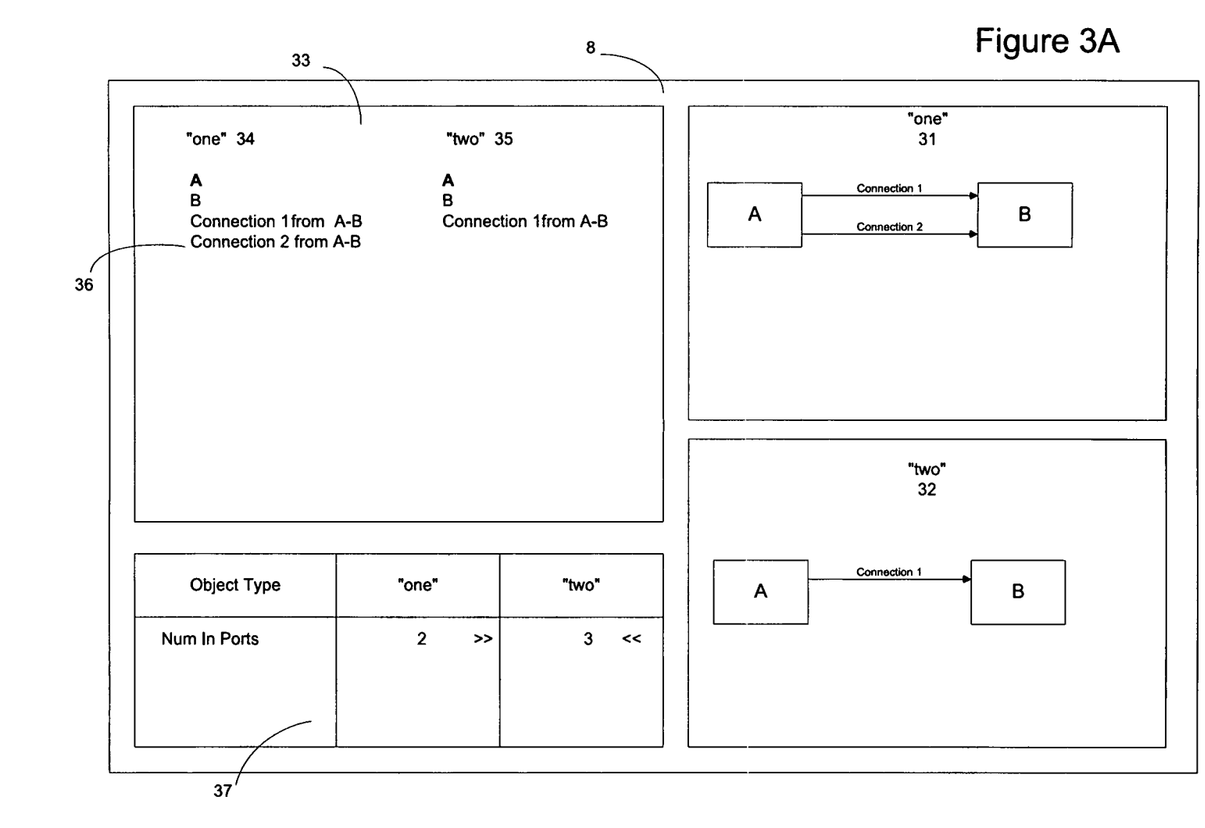
FIG. 3A depicts a block diagram of displayed differences in the illustrative embodiment of the present invention.

When the diagramming application 6 first begins the merge process in one embodiment of the present invention, the user 10 is presented with four GUI components (the GUI components are illustrated in FIG. 3A below). The display device 8 displays all of the graphical difference items found in electronic diagrams A and B including any number of graphical child data elements. Each of the child data elements includes any number of property data elements. The user 10 is also presented with a display of a first diagram with a "current" difference item highlighted. A "current" difference item is one of the identified difference items in the diagram which is visually accentuated to focus the user's attention. The user may replace the current difference item with a different difference item (which then becomes the current difference item). The third GUI component is a display of a second diagram with a current difference item highlighted. The electronic diagram's internal data format has no relevance to the merging operation. A fourth GUI component, an attribute difference panel is used to present an itemization of differences in data objects in the two electronic diagrams.

FIG. 3A depicts the GUI components that are used to present identified differences between two electronic diagrams to the user 10. The display device 8 presents three windows 31, 32 and 33 to a user. An electronic diagram entitled "one" is presented to the user 10 in a window 31 in the top right of the display surface of the display device 8. An electronic diagram entitled "two" is presented to the user 10 in a window 32 in the bottom right of the display surface of the display device 8. A third window 33 ("the difference window") holding identified differences (optionally together with all diagram elements for context) between the two electronic diagrams is presented to the user 10 on the left side of the display surface of the display device 8. The difference window 33 includes two trees 34 and 35 listing the identified data objects listed side by side so that corresponding locations in the two electronic diagrams appear next to each other. Thus, both trees 34 and 35 list a block A and a block B and a first connection that runs between the two blocks in the same order. A second connection 36 running between the two blocks appears only in the first electronic diagram and therefore appears only in the tree 34 for electronic diagram "one". The second connection 36 is a unique item and is therefore highlighted in a manner designed to bring it to the user's attention. A fourth window 37 presents an itemization of data object differences, indicating that blocks "one" and "two" have a different number of ports. Those skilled in the art will recognize that the positions of the windows on the display surface of the display device 8 are an implementation choice which may be altered without departing from the scope of the present invention. Similarly a different data presentation format may be substituted for the tree structure discussed above.

Figure 3B:
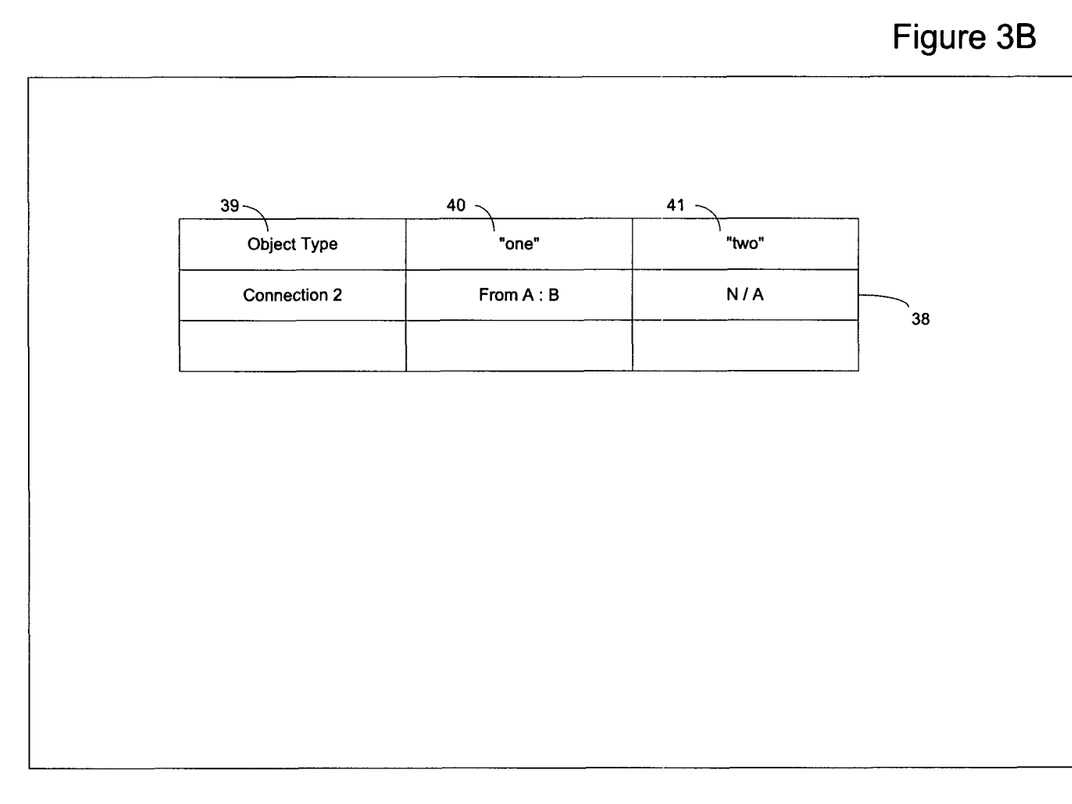
FIG. 3B depicts a block diagram of a report of the identified differences between two electronic diagrams in the illustrative embodiment of the present invention.

As noted above, the results of the differencing operation are stored in a dataset. The dataset lists the components in the two diagrams that are involved in the diagram and the type of object that appears as a difference. In addition to being graphically presented to the user 10 as outlined in FIG. 3A the differences contained in the dataset may also be presented to the user 10 in a report. FIG. 3B depicts the presentation of a static difference report 38 to the user 10. The report 38 may include hyperlinks back to the electronic diagrams. The report 38 includes a column 39 for the object type of the difference identified, and columns 40 and 41 for the involved objects in the two electronic diagrams. The report 38 indicates that block A and B in electronic diagram "one" and "two" have differences within the blocks.

Figure 4:
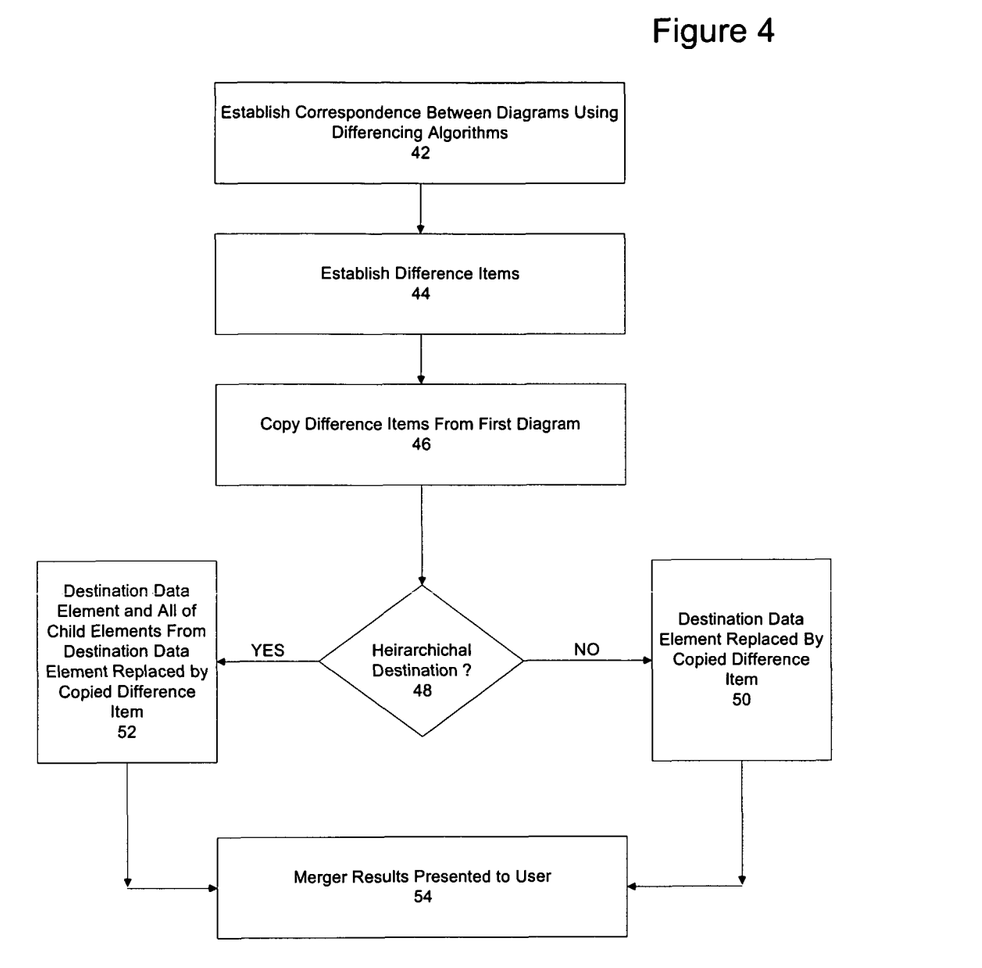
FIG. 4 depicts the sequence of steps followed by the illustrative embodiment of the present invention in performing an exact merge.

The illustrative embodiment of the present invention enables a user to specify which of the difference items within a selected section of a diagram to merge into the other diagram. An "exact merge" copies all of the difference items in a selected diagram section from one diagram to the other. FIG. 4 depicts the sequence of steps followed by the illustrative embodiment of the present invention in performing an exact merge. First, corresponding areas of two displayed diagrams are established by the matching algorithm in the diagramming application 6 (step 42). The corresponding sections of the two diagrams contain system components and connections which are present in both diagrams. After corresponding sections of the two diagrams have been determined, the diagramming application 6 uses a compare algorithm to establish difference items between the corresponding sections of the diagrams (i.e., attributes which are different from one diagram to the other) (step 44). Difference items are highlighted and presented to the user 10 who then selects which difference items to merge. This selection also involves the user 10 determining in which direction the merge process is to run (i.e.: whether the differences should be merged from diagram A to diagram B, or alternatively, from diagram B to diagram A). Once selected, the difference items are then copied (step 46).

The different data elements making up the system components or states in the diagrams may include sublevels associated with the represented components. For example, a parent component may have multiple sub-components arranged in a parent and child tree-like structure. The illustrative embodiment of the present invention provides a method of merging both parent and child elements which may be selected by the user 10. A determination is made as to whether or not the corresponding section of the destination diagram is "hierarchical", that is, whether or not the destination data element has child elements associated with the displayed parent element (step 48). If the destination data element is not a hierarchical data element, then only the destination data element is replaced by the copied difference item (step 50). Alternatively, if the destination data item is a hierarchical item possessing child elements, the destination data element and all of the child elements are replaced by the copied difference item (step 52). The user may also choose to copy only portions of a hierarchical difference item such that only a parent portion of a data element is merged and replaced, or alternatively, only a child or several generations of children elements are merged and replaced while the parent element is left untouched. Once the merge process has been completed, the results of the merge are presented to the user 10 on the display device 8 (step 54).

The illustrative embodiment of the present invention categorizes detected differences according to type. Some of the differences identified in the two displayed diagrams are the result of functional differences in system components or system states. Other differences on the displayed diagrams are the result of graphical or cosmetic differences in the manner in which the system diagram is presented to the user. The illustrative embodiment provides a method of selecting which types of differences to merge from one diagram to the other. The user may select a merger of all of the functional differences and those cosmetic differences not requiring major revisions to the destination diagram. The determination as to whether the revision would be a major revision or not is based on pre-defined parameters regarding how much of the drawing would have to be re-drawn. Examples of cosmetic or graphic differences are the position of a block in a subsystem or the path of a line from one block to another in a subsystem.

Figure 5:
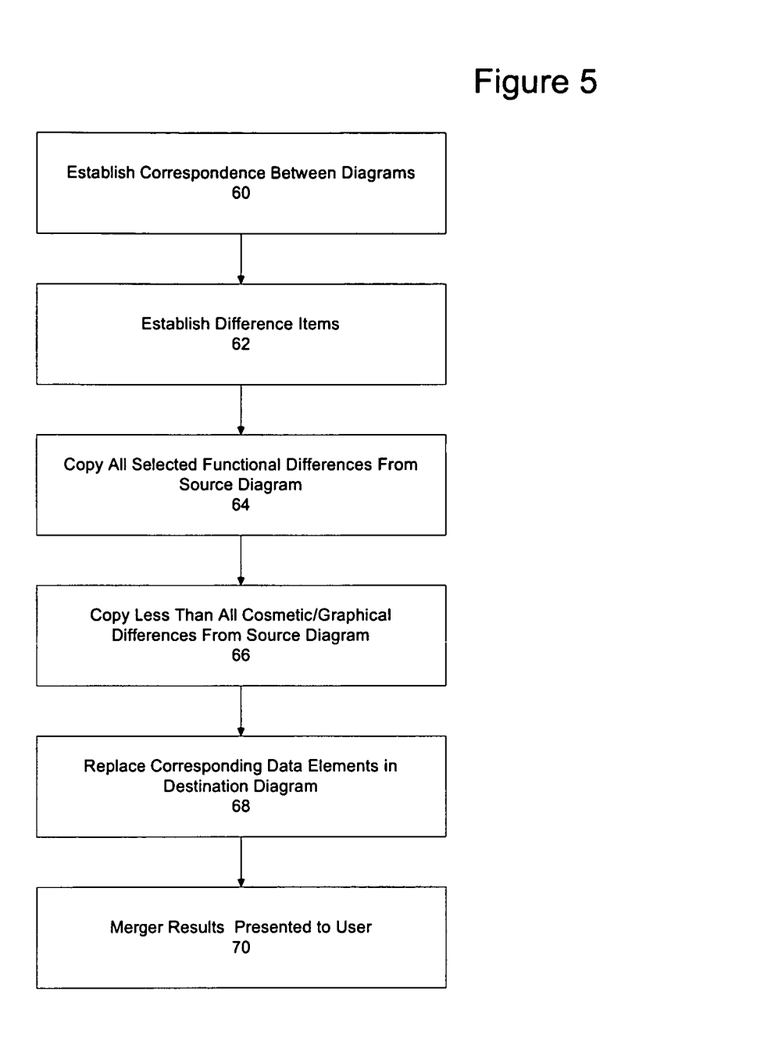
FIG. 5 depicts a sequence of steps followed by an illustrative embodiment of the present invention in performing an heuristic merge.

Mergers where all of the functional differences and less than all of the cosmetic or graphical differences are copied are referred to "heuristic". FIG. 5 depicts the sequence of steps followed by the illustrative embodiment of the present invention in performing a heuristic merge. A heuristic merge begins when the matching algorithm in the diagramming application 6 establishes corresponding areas between the two diagrams (step 60). Once the corresponding areas of the two diagrams have been established, differences within the corresponding areas are determined and difference items determined using the compare algorithm of the diagramming application 6 (step 62). The differences are categorized as either functional or cosmetic/graphical.

All of the functional differences in the difference items selected items are copied (step 64). Less than all of the graphic differences are also copied (step 66). The selected differences are then merged with the destination diagram thereby replacing the corresponding data elements in the second diagram with the copied difference items (step 68). Once the merge operation is complete, the results are presented to the user (step 70). Those skilled in the art will recognize that the heuristic merge is used when merging difference items that have graphical incompatibilities in the destination electronic diagram such as connections between blocks of different positions, yet a line connection between the blocks is still desired by the user 10. Similar to the exact merge, the heuristic merge may also cascade hierarchically. If the heuristic merge is utilized, it replaces all of the parent and child data elements as noted above.

The illustrated embodiment of the present invention also enables the user 10 to perform a merge of one of the current difference items. The merge of the current difference item is referred to as a "contextual merge". Using either GUI buttons, keyboard mappings or menu items, the user 10 may command an immediate merge of either of the current difference items to replace the other current difference item, either A to B or B to A. If an exact merge is possible, it is performed. If an exact merge is not possible a heuristic merge is performed. If the data elements of the difference item being merged contains child data elements, the merge is hierarchically cascaded.

The illustrative embodiment of the present invention allows a user to programmatically merge two displayed diagrams. By selecting the type of merge operation, the user may control the features that are copied from one diagram to another. By selecting merge locations, the user can control which parts of the diagrams are merged. Additionally, the user may select specific features from within an area to merge and the merge operation may be performed in both directions within a single operating session. The ability to perform the merge operations programmatically enables multiple versions of similar diagrams to be rapidly compared.

The API of the differencing engine 7 can be utilized to extract differences between an electronic diagram in memory and an electronic diagram stored in a configuration management system (a/k/a "revision control system") by using a single command executed in the MATLAB language environment. For example, three electronic diagrams A, B, C, may be compared separately by the differencing engine 7 to a single electronic diagram X stored in a configuration management system. The differences between electronic diagrams A, B and C in memory and the single electronic diagram X stored in the configuration management system can be applied sequentially to X (to the degree the difference regions do not intersect) to merge all differences from A, B, and C into X and store the merged X as a new revision of X in the configuration management system. As long as the differences in A, B, and C with respect to X do not intersect with each other, the order of differencing of A, B, and C with respect to X can occur in any order. Merging can begin after differencing is complete.

It will thus be seen that the invention attains the objects made apparent from the preceding description. Since certain changes may be made without departing from the scope of the present invention, it is intended that all matter contained in the above description or shown in the accompanying drawings be interpreted as illustrative and not in a literal sense. Practitioners of the art will realize that the system configurations depicted and described herein are examples of multiple possible system configurations that fall within the scope of the current invention. Likewise, the sequence of steps utilized in the illustrated flowcharts are examples and not the exclusive sequence of steps possible within the scope of the present invention.

We claim:

1. A method comprising:
    identifying a first electronic diagram,
        the identifying the first electronic diagram being performed by an electronic device,
        the first electronic diagram including components,
        the components, included in the first electronic diagram, producing results when the components, included in the first electronic diagram, are executed;
    identifying a second electronic diagram,
        the identifying the second electronic diagram being performed by the electronic device,
        the second electronic diagram including components,
        the components, included in the second electronic diagram, producing results when the components, included in the second electronic diagram, are executed;
    matching a component of the components in the first electronic diagram with a component of the components in the second electronic diagram,
        the matching being performed by the electronic device;
    identifying one or more graphical property differences or functional property differences associated with the matched component,
        the identifying the one or more graphical property differences or functional property differences being performed by the electronic device;
    receiving a selection,
        the receiving the selection being performed by the electronic device,
        the selection identifying a section of the first electronic diagram,
        the selected section of the first electronic diagram identifying less than all of the first electronic diagram;
    determining whether the identified one or more graphical property differences or functional property differences should be merged from the selected section of the first electronic diagram into a corresponding section of the second electronic diagram,
        the determining whether the identified one or more graphical property differences or functional property differences should be merged being performed by the electronic device;
    merging the identified one or more graphical property differences or functional property differences from the selected section of the first electronic diagram into the corresponding section of the second electronic diagram when the identified one or more graphical property differences or functional property differences should be merged,
        the corresponding section of the second electronic diagram, after merging the identified one or more graphical property differences or functional property differences, including the matched component,
        the matched component representing fewer than all of the components included in the first electronic diagram, and
        the matched component producing a result when the matched component is executed; and
    storing the second electronic diagram when the second electronic diagram includes the matched component and the merged identified one or more graphical property differences or functional property differences,
        the stored second electronic diagram being provided to a display device when the stored second electronic diagram is requested,
        the display device displaying the stored second electronic diagram when the stored second electronic diagram is requested.

2. The method of claim 1, further comprising:
    providing, to the display device, the stored second electronic diagram.

3. The method of claim 1, where determining whether the identified one or more graphical property differences or functional property differences should be merged include:
    determining whether the identified one or more graphical property differences or functional property differences should be merged based on a user selection.

4. The method of claim 1, where the matched component is associated with a hierarchy.

5. The method of claim 4, where the hierarchy is preserved after merging the identified one or more graphical property differences or functional property differences.

6. The method of claim 1, further comprising:
    providing, to the display device, the identified graphical property differences or functional property differences in a tree format,
        the display device displaying the identified graphical property differences or functional property differences in the tree format.

7. The method of claim 1, further comprising:
    causing the identified graphical property differences or functional property differences to be highlighted on the display device.

8. A non-transitory computer-readable medium storing instructions, the instruction comprising:
    a plurality of instructions that, when executed by an electronic device, cause the electronic device to:
        identify a first electronic diagram,
            the first electronic diagram including components,
            the components producing results when the components are executed;
        identify a second electronic diagram,
            the second electronic diagram including components,
            the components producing results when the components are executed;
        match a component, of the components included in the first electronic diagram, with one of the components included in the second electronic diagram,
            the matched component representing a subset of the components in the first electronic diagram;
        identify graphical property differences or functional property differences associated with the matched component;
        receive a selection of a section of the first electronic diagram,
            the selected section of the first electronic diagram being less than all of the first electronic diagram;
        determine whether the identified graphical property differences or functional property differences should be merged from the first electronic diagram into a section of the second electronic diagram corresponding to the selected section of the first electronic diagram;
        merge the identified graphical property differences or functional property differences from the first electronic diagram into the second electronic diagram based on determining whether the identified graphical property differences or functional property differences should be merged, the second electronic diagram including, after merging the identified graphical property differences or functional property differences, the matched component, the matched component producing a result when the matched component is executed when the second electronic diagram includes the merged identified graphical property differences or functional property differences; and store the second electronic diagram when the second electronic diagram includes the merged identified graphical property differences or functional property differences, the stored second electronic diagram to be provided to a display device associated with the electronic device, the display device to display the stored second electronic diagram.

9. The medium of claim 8, where the instructions further comprise:

one or more instructions that, when executed by the electronic device, cause the electronic device to provide, to the display device, the stored second electronic diagram.

10. The medium of claim 8, where one or more instructions, of the plurality of instructions, to determine whether the identified graphical property differences or functional property differences should be merged include:

one or more instructions that, when executed by the electronic device, cause the electronic device to determine whether the identified graphical property differences or functional property differences should be merged based on a user selection.

11. The medium of claim 8, where the matched component is associated with a hierarchy.

12. The medium of claim 11, where one or more instructions, of the plurality of instructions, to merge the identified graphical property differences or functional property differences include:

one or more instructions that, when executed by the electronic device, cause the electronic device to preserve the hierarchy.

13. The medium of claim 8, where the first electronic diagram or the second electronic diagram comprises a block diagram, a state diagram, a signal diagram, a flow chart diagram, a sequence diagram, a unified modeling language (UML) diagram, a data flow diagram, a circuit diagram, a ladder logic diagram, or a kinematic element diagram.

14. The medium of claim 8, where the instructions further comprise:

one or more instructions that, when executed by the electronic device, cause the electronic device to provide, to the display device, the identified graphical property differences or functional property differences in a tree view, the display device to display the identified graphical property differences or functional property differences in the tree view.

15. The medium of claim 14, where the instructions further comprise:

one or more instructions that, when executed by the electronic device, cause the electronic device to cause the identified graphical property differences or functional property differences, in the tree view, to be highlighted on the display device.

16. A method comprising:

identifying a first electronic diagram, the identifying the first electronic diagram being performed by an electronic device, the first electronic diagram including components;

identifying a second electronic diagram, the identifying the second electronic diagram being performed by the electronic device, the second electronic diagram including components;

matching a component, of the components included in the first electronic diagram, with one or more of the components included in the second electronic diagram, the matching being performed by the electronic device;

identifying one or more graphical property differences or functional property differences based on matching the component, of the components included in the first electronic diagram, with the one or more of the components included in the second electronic diagram, the identifying the one or more graphical property differences or functional property differences being performed by the electronic device;

merging the identified one or more graphical property differences or functional property differences from the first electronic diagram into the second electronic diagram, the merging the identified one or more graphical property differences or functional property differences being performed by the electronic device, the second electronic diagram including the matched component after merging the identified one or more graphical property differences or functional property differences, the matched component producing a result when the matched component is executed; and storing the second electronic diagram after merging the identified one or more graphical property differences or functional property differences, the storing the second electronic diagram being performed by the electronic device, the stored second electronic diagram to be provided to a display device associated with the electronic device, the display device to display the stored second electronic diagram.

17. The method of claim 16, further comprising:

receiving a selection of a section of the first electronic diagram, where merging the identified one or more graphical property differences or functional property differences includes:

merging the identified one or more graphical property differences or functional property differences from the first electronic diagram into a section of the second electronic diagram that corresponds to the section of the first electronic diagram.

18. The method of claim 16, where the matched component is associated with a hierarchy, and where the hierarchy is preserved after merging the identified one or more graphical property differences or functional property differences.

19. The method of claim 16, further comprising:

providing the first electronic diagram and the second electronic diagram to the display device prior to merging the identified one or more graphical property differences or functional property differences, the display device to display the first electronic diagram and the second electronic diagram.

20. The method of claim 19, further comprising:
causing the identified one or more graphical property differences or functional property differences to be highlighted on the display device.

\* \* \* \* \*